United States Patent
Fujiwara et al.

(10) Patent No.: US 8,289,992 B2
(45) Date of Patent: Oct. 16, 2012

(54) WIRELESS SENSOR-NETWORK SYSTEM, SENSING TERMINAL NODE, AND BASE STATION

(75) Inventors: Ryosuke Fujiwara, San Jose, CA (US); Masayuki Miyazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 419 days.

(21) Appl. No.: 12/604,682

(22) Filed: Oct. 23, 2009

(65) Prior Publication Data

US 2010/0103878 A1  Apr. 29, 2010

(30) Foreign Application Priority Data

Oct. 24, 2008  (JP) ................................. 2008-274096

(51) Int. Cl.
*H04J 3/00* (2006.01)
(52) U.S. Cl. ........................................ 370/464
(58) Field of Classification Search .................. None
See application file for complete search history.

(56) References Cited

U.S. PATENT DOCUMENTS

| | | | | |
|---|---|---|---|---|
| 7,020,701 B1 * | 3/2006 | Gelvin et al. | ................ | 709/224 |
| 7,324,824 B2 * | 1/2008 | Smith et al. | ................ | 455/456.1 |
| 7,853,251 B2 * | 12/2010 | Sehedic et al. | ............. | 455/422.1 |
| 2005/0068934 A1 * | 3/2005 | Sakoda | ............. | 370/350 |
| 2005/0282558 A1 * | 12/2005 | Choi et al. | ................ | 455/456.1 |
| 2007/0140295 A1 * | 6/2007 | Akaboshi | ................ | 370/468 |
| 2008/0214177 A1 * | 9/2008 | Sehedic et al. | ............. | 455/422.1 |
| 2008/0252475 A1 * | 10/2008 | Jensen et al. | ................ | 340/683 |
| 2009/0323564 A1 * | 12/2009 | Chiu | ............................ | 370/280 |

FOREIGN PATENT DOCUMENTS

| | | |
|---|---|---|
| JP | 2004-187040 | 7/2004 |
| JP | 2007-018211 | 1/2007 |

* cited by examiner

*Primary Examiner* — Chi Pham
*Assistant Examiner* — Fan Ng
(74) *Attorney, Agent, or Firm* — Antonelli, Terry, Stout & Kraus, LLP.

(57) ABSTRACT

To correct a sensor data acquisition time with a simple hardware configuration, provided is a wireless sensor-network system including: a base station; and a plurality of sensing terminal nodes, the base station transmitting a beacon at predetermined intervals to the plurality of sensing terminal nodes, the plurality of sensing terminal nodes measuring data and transmitting, based on a reception of the beacon transmitted from the base station, the sensor data thus obtained to the base station, in which the plurality of sensing terminal nodes obtain, based on an internal clock, a time at which the beacon is received and transmit the time to the base station, and the base station corrects, based on the reception time transmitted from each of the plurality of sensing terminal nodes, the sensor data acquisition time.

17 Claims, 12 Drawing Sheets

| PACKET NO | STORED DATA |
|---|---|
| P1 | D(1),D(7),D(13),D(19),D(25),D(31) |
| P2 | D(2),D(8),D(14),D(20),D(26),D(32) |
| P3 | D(3),D(9),D(15),D(21),D(27),D(34) |
| P4 | D(4),D(10),D(16),D(22),D(28),D(34) |
| P5 | D(5),D(11),D(17),D(23),D(29),D(35) |
| P6 | D(6),D(12),D(18),D(24),D(30),D(36) |
| P7 | D(37),D(43),D(49),D(55),D(61),D(67) |
| P8 | D(38),D(44),D(50),D(56),D(62),D(68) |
| P9 | D(39),D(45),D(51),D(57),D(63),D(69) |
| P10 | D(40),D(46),D(52),D(58),D(64),D(70) |
| P11 | D(41),D(47),D(53),D(59),D(65),D(71) |
| P12 | D(42),D(48),D(54),D(60),D(66),D(72) |

*FIG.11*

WIRELESS SENSOR-NETWORK SYSTEM, SENSING TERMINAL NODE, AND BASE STATION

CLAIM OF PRIORITY

The present application claims priority from Japanese patent application JP2008-274096 filed on Oct. 24, 2008, the content of which is hereby incorporated by reference into this application.

BACKGROUND

This invention relates to a wireless sensor-network system for transmitting sensor data through wireless communication, and more particularly, to a method of synchronizing sensor data obtained by a plurality of sensing terminal nodes.

In a wireless sensor-network system, environmental data is obtained at multiple points and the obtained environmental data is collected. The environmental data is obtained by measuring temperature, acceleration, pressure, and the like, which represent a state at each of the multiple points. In order that the wireless sensor-network system may correctly process the measured environmental data, a plurality of sensing terminal nodes installed at the multiple points away from one another are required to measure the environmental data simultaneously with one another. In other words, the wireless sensor-network system is required to accurately synchronize the environmental data transmitted from the plurality of sensing terminal nodes installed at the multiple points away from one another.

An example of the method of synchronizing environmental data measured at multiple points includes a method in which each sensing terminal node receives a signal, such as the Global Positioning System (GPS) signal, or a standard time and frequency signal, corrects an internal clock of the sensing terminal node based on the received signal, and adds a time stamp based on a standard time to the measured environmental data (see, for example, JP 2007-018211 A).

Alternatively, there is another method for use in a wireless sensor-network system in which the sensing terminal nodes are connected to one another through wired connection. According to the method, each sensing terminal node periodically obtains a clock value provided to a reference sensing terminal node, and adds the obtained clock value to environmental data (see, for example, JP 2004-187040 A).

SUMMARY

When a plurality of sensing terminal nodes measure environmental data, an error is observed in sampling intervals of the sensing terminal nodes, due to errors between the internal clocks provided to the sensing terminal nodes. Here, a case is illustrated where two sensing terminal nodes 1 and 2 each sample environmental data.

FIG. 1 is an explanatory diagram illustrating an error between sampling intervals in the sensing terminal node 1 and the sensing terminal node 2.

The sensing terminal node 1 and the sensing terminal node 2 each sample environmental data D1 and D2, at regular intervals.

However, there is an error between the internal clocks provided to the sensing terminal nodes 1 and 2, and hence, a time T1(M) at which the sensing terminal node 1 sampled data for the M-th time is different from a time T2(M) at which the sensing terminal node 2 sampled data for the M-th time. Accordingly, sensor data D1(M) sampled (obtained) at the time T1(M) and sensor data D2(M) sampled (obtained) at the time T2(M) may not be regarded as the same sensor data obtained at the same time.

Here, when net sampling intervals of the sensing terminal node 1 and the sensing terminal node 2 are given as ds1 and ds2, respectively, the time T1(M) and the time T2(M) are given by the following equations.

$$T1(M)=M \times ds1 \quad (1)$$

$$T2(M)=M \times ds2 \quad (2)$$

Accordingly, in order that the T1(M) and the T2(M) may agree in time (or in timing), the sampling intervals ds1 and ds2 are required to be the same.

In the technology disclosed in JP 2007-018211 A, the internal clocks of the sensing terminal nodes are corrected based on the GPS signal or a standard time and frequency signal. In other words, the internal clocks are corrected so that ds1 becomes equal to ds2. In this manner, the wireless sensor-network system synchronizes sensor data.

However, according to the technology disclosed in JP 2007-018211 A, it is necessary to provide each of the sensing terminal nodes with extra hardware for receiving a signal such as the GPS signal or a standard time and frequency signal. Further, it is also necessary to provide each of the sensing terminal nodes with a function of correcting the clock of the sensing terminal node.

Therefore, the technology disclosed in JP 2007-018211 A is incapable of achieving simplification and low power consumption of the hardware of the sensing terminal node.

On the other hand, according to the technology disclosed in JP 2004-187040 A, each of the sensing terminal nodes obtains a clock value of the reference sensing terminal node, and obtains a relative difference between the internal clock of its own station and the clock of the reference sensing terminal node. Further, the base station uses clock values transmitted from the sensing terminal nodes, and determines a relation between ds1 and ds2, so as to correct the time of each of the internal clocks of the sensing terminal nodes.

The technology disclosed in JP 2004-187040 A may be capable of simplifying the hardware configuration of each of the sensing terminal nodes. However, each of the sensing terminal nodes is required to obtain a reference clock value through a network. For this reason, the sensing terminal nodes each request the base station to transmit a clock value of the reference sensing terminal node and receive the transmitted clock, which increases the communication traffic on the network, with the result that the communication resources are consumed.

Accordingly, it is difficult to apply the technology disclosed in JP 2004-187040 A to a wireless sensor-network system in which the sensing terminal nodes are connected to one another through wireless connection with limited communication resources.

It is an object of this invention to provide a highly-reliable wireless sensor-network system capable of establishing synchronism among sensor data sampled at multiple points, while including sensing terminal nodes of simple configuration for preventing consumption of communication resources.

A representative aspect of this invention is as follows.

A wireless sensor-network system, comprising: a base station; and a plurality of sensing terminal nodes, the base station transmitting a beacon at predetermined timing to the plurality of sensing terminal nodes, the plurality of sensing terminal nodes measuring data and transmitting, according to the beacon that has been transmitted from the base station, the measured data to the base station, wherein: the plurality of sensing terminal nodes comprise a first sensing terminal node serving as a reference and a second sensing terminal node other than the first sensing terminal node; the plurality of sensing terminal nodes each include: a sensor for measuring predetermined data; a transmission and reception unit for transmitting and receiving a signal to and from the base station; and a control unit for controlling acquisition of the data measured by the sensor and transmission of the obtained data; the control unit obtains a time at which the beacon is received; the transmission and reception unit transmits the reception time of the beacon and the obtained data, to the base station; and the base station receives the reception time of the beacon and the obtained data in each of the plurality of sensing terminal nodes, and corrects an acquisition time of the data, based on a relative relation between the beacon reception time received from the first sensing terminal node and the beacon reception time received from the second sensing terminal node.

According to an embodiment of this invention, a base station of the wireless sensor-network system is capable of synchronizing sensor data sampled by the sensing terminal nodes of simple configuration at multiple points.

BRIEF DESCRIPTION OF THE DRAWINGS

FIG. 11 is an explanatory diagram illustrating the modification example of the data packet configuration according to the first embodiment of this invention.

DETAILED DESCRIPTION OF THE PREFERRED EMBODIMENTS

First Embodiment

Hereinbelow, a wireless sensor-network system according to a first embodiment of this invention is described with reference to FIGS. 2 to 11.

Figure 2:
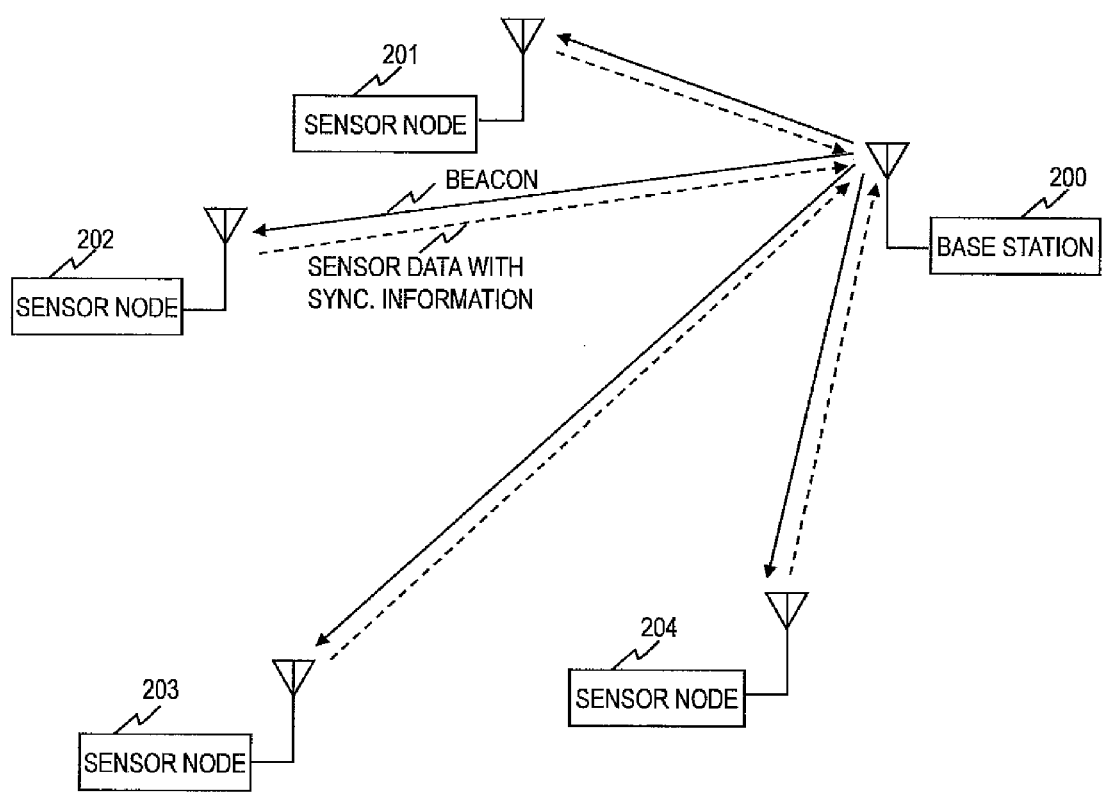
FIG. 2 is an explanatory diagram illustrating an example of a configuration of the wireless sensor-network system according to the first embodiment of this invention.

FIG. 2 is an explanatory diagram illustrating an example of a configuration of the wireless sensor-network system according to the first embodiment of this invention.

The wireless sensor-network system according to the first embodiment includes a base station 200, and a plurality of sensing terminal nodes (sensor nodes) (for example, a sensing terminal node 201, a sensing terminal node 202, a sensing terminal node 203, a sensing terminal node 204, and the like).

The base station 200 periodically transmits a beacon to each of the plurality of sensing terminal nodes. The plurality of sensing terminal nodes each receive the beacon, and creates synchronous (sync.) information based on the received beacon. Further, the plurality of sensing terminal nodes transmit the created synchronous information and obtained sensor data to the base station 200.

Figure 1:
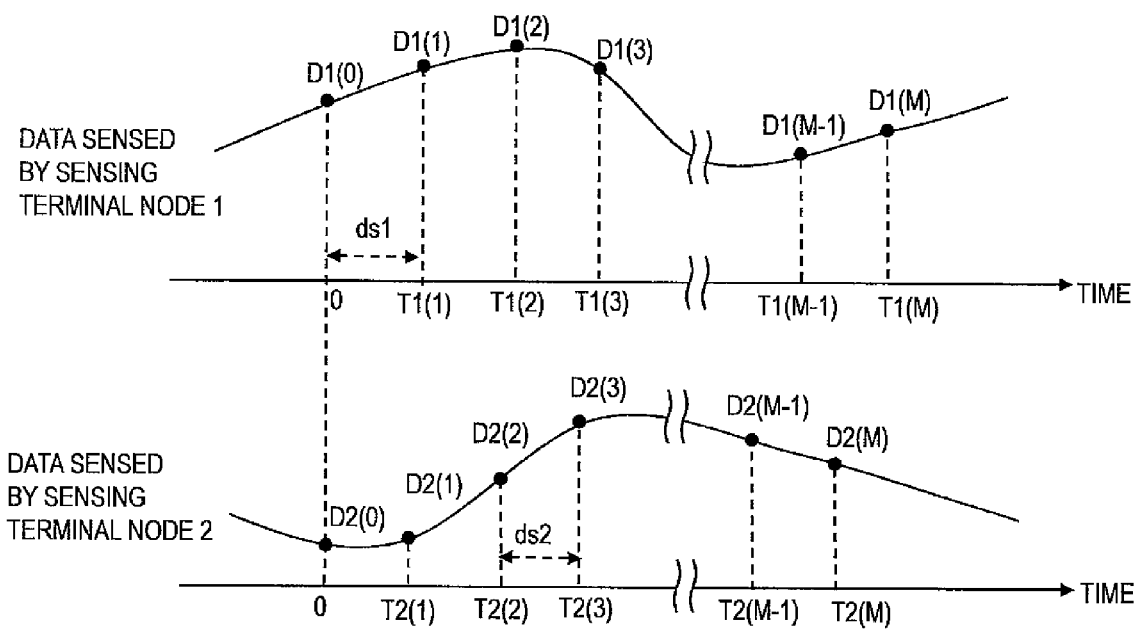
FIG. 1 is an explanatory diagram illustrating an error between the sampling intervals in the sensing terminal node 1 and the sensing terminal node 2.

It should be noted that the plurality of sensing terminal nodes 201, 202, 203, and 204 illustrated in FIG. 2 are identical with one another in configuration, and hereinafter the plurality of sensing terminal nodes are collectively referred to as sensing terminal node 201 when a description applicable to any of the sensing terminal nodes is given. Further, the number of the sensing terminal nodes illustrated in FIG. 2 is four, which may be appropriately changed according to the architecture of the wireless sensor-network system. FIG. 1 is an explanatory diagram illustrating an error between the sampling intervals in the sensing terminal node 1 and the sensing terminal node 2.

Further, processing to be performed in the wireless sensor-network system according to the first embodiment is specifically described later with reference to FIGS. 3, 4, 5, and 6.

Figure 3:
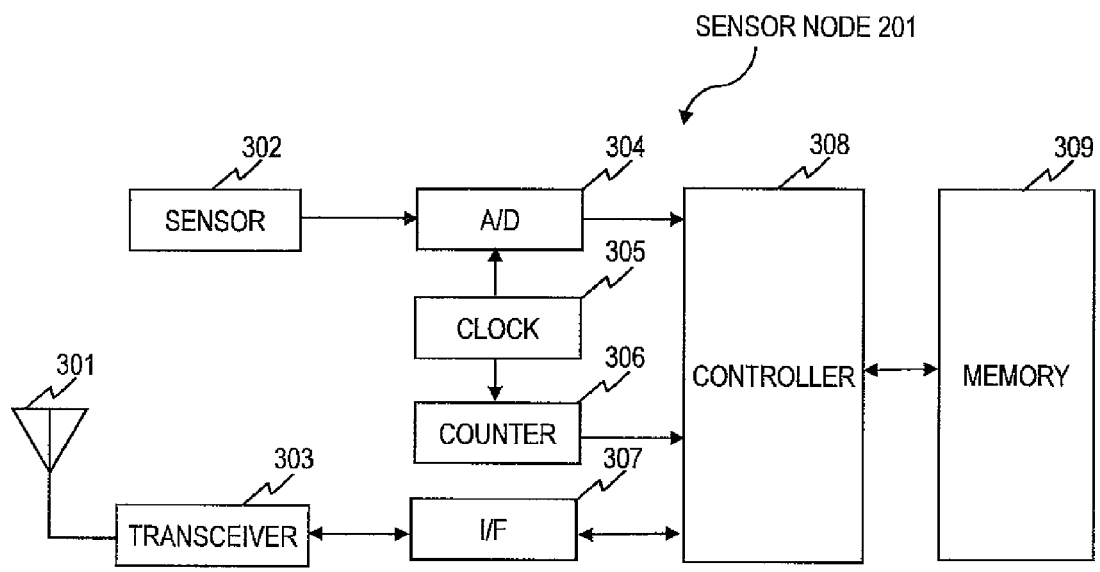
FIG. 3 is a block diagram illustrating an example of a configuration of the sensing terminal node 201 according to the first embodiment of this invention.

FIG. 3 is a block diagram illustrating an example of a configuration of the sensing terminal node 201 according to the first embodiment of this invention.

The sensing terminal node 201 includes an antenna 301, a sensor 302, a transceiver 303, an analog-to-digital converter (A/D) 304, a clock generator 305, a counter 306, an interface (I/F) 307, a controller 308, and a memory 309.

The antenna 301 receives a beacon transmitted by the base station 200, and transmits the obtained sensor data and synchronous information to the base station 200.

The sensor 302 obtains environmental data by measuring acceleration, temperature, humidity, pressure, relative speed, and the like, at a place where the sensor 302 is installed. The transceiver 303 processes transmission and reception signals. The analog-to-digital converter 304 subjects the environmental data obtained by the sensor 302 to analog-to-digital conversion.

The clock generator 305 generates a clock of a predetermined frequency, to thereby supply timing based on which the analog-to-digital converter 304 samples the environmental data obtained by the sensor 302.

The counter 306 counts the clock generated by the clock generator 305. The interface 307 mutually converts the signals transmitted and received by the transceiver 303 and data processed by the controller 308.

The controller 308 creates synchronous information based on the received beacon, and controls the transmission of the created synchronous information and the sensor data sampled by the analog-to-digital converter 304. The memory 309 is a buffer for storing the sampled sensor data and a data packet to be transmitted.

Figure 4:
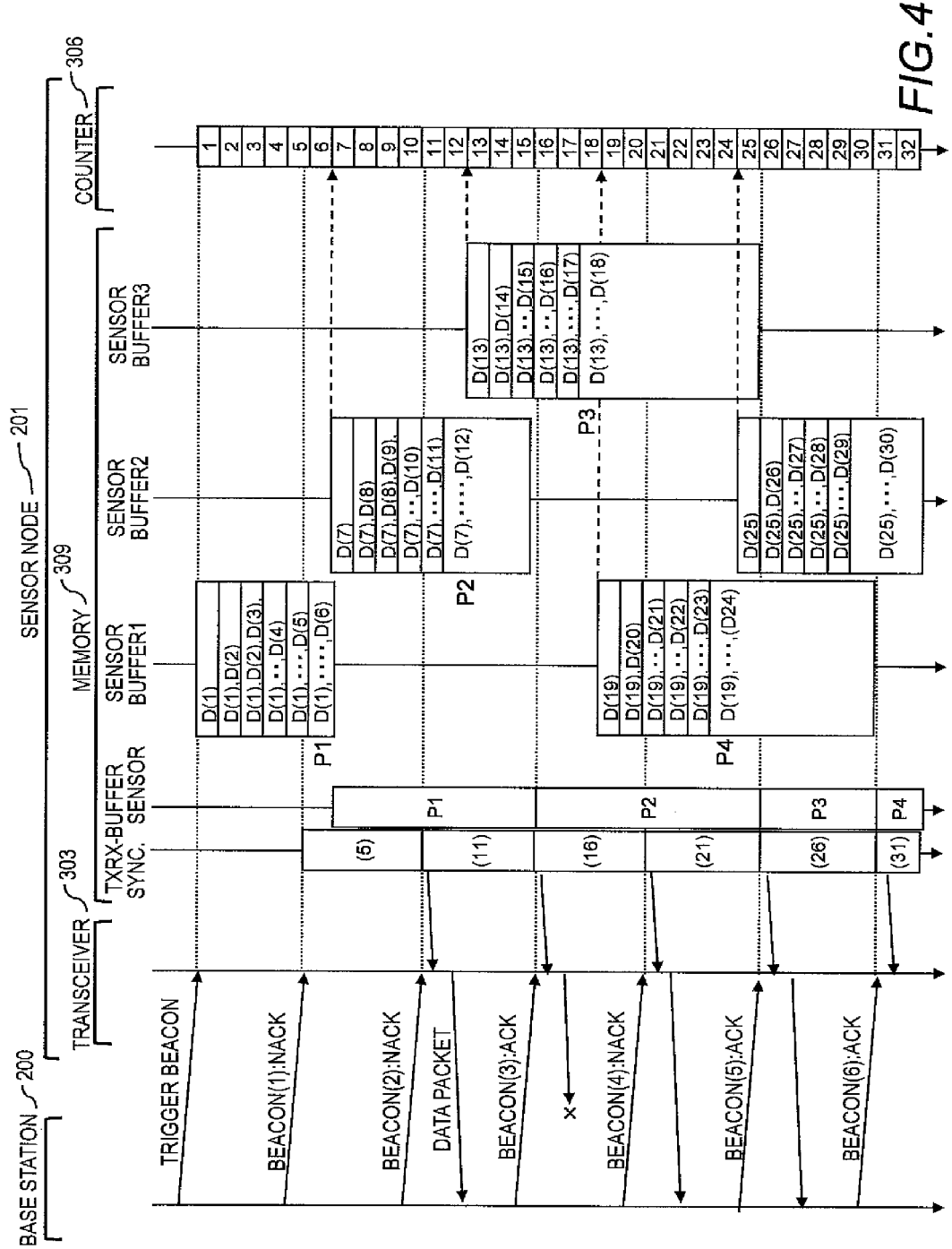
FIG. 4 is an explanatory diagram illustrating an example of the processing to be performed in the wireless sensor-network system according to the first embodiment of this invention.

FIG. 4 is an explanatory diagram illustrating an example of the processing to be performed in the wireless sensor-network system according to the first embodiment of this invention.

In this example, a description is given of transmission and reception of a radio signal between the base station 200 and the sensing terminal node 201, and internal processing of the sensing terminal node 201. The internal processing to be performed by the sensing terminal node 201 is described based on processing of the transceiver 303, the memory 309, and the counter 306 provided to the sensing terminal node 201.

It should be noted that the memory 309 of the sensing terminal node 201 includes a transmission and reception buffer (TxRx-buffer), a sensor buffer 1, a sensor buffer 2, and a sensor buffer 3.

Further, the transmission and reception buffer of the memory 309 includes a synchronous information area for storing a counter value obtained when a beacon is received, and a sensor area for storing a sensor data packet.

First, the base station 200 transmits a trigger beacon to the sensing terminal node 201. After transmitting the trigger beacon, the base station 200 periodically transmits a beacon based on predetermined timing.

The transceiver 303 of the sensing terminal node 201 receives the trigger beacon transmitted by the base station 200. After receiving the trigger beacon, the transceiver 303 receives the beacon periodically transmitted.

Having received the trigger beacon described above, the sensing terminal node 201 starts sensing data.

Specifically, the analog-to-digital converter 306 of the sensing terminal node 201 samples the environmental data input from the sensor 302, based on the timing of the clock generated by the clock 305. The counter 306 of the sensing terminal node 201 starts counting the clock supplied by the clock 305.

The controller 308 of the sensing terminal node 201 stores the sampled (obtained) sensor data (D(1), D(2), . . . ) in the sensor buffer 1 of the memory 309. Here, the sensor data D(1) corresponds to sensor data obtained at a timing when the counter 306 counts "1".

Next, the controller 308 stores sensor data (D(1), D(2), . . . , D(6)) corresponding to one packet, in the sensor buffer 1, and then stores sensor data (D(7), D(8), . . . , D(12)) corresponding to a second packet, in the sensor buffer 2. The controller 308 further stores sensor data (D(13), D(14), . . . , D(18)) corresponding to a third packet, in the last sensor buffer 3.

It should be noted that the number of sensor buffers included in the memory 309 and the number of sensor data to be contained in one packet may be appropriately changed, according to the architecture of the wireless sensor-network system.

Next, the controller 308 migrates the sensor data for one packet (packet P1) stored in the sensor buffer 1 to the sensor area of the transmission and reception buffer.

Further, the controller 308 stores a counter value (for example, "5") of the counter 306 obtained when the transceiver 303 has received a beacon (for example, Beacon (1)), in the synchronous information area of the transmission and reception buffer.

Next, having received a beacon, the controller 308 passes synchronous information and sensor data for one packet stored in the synchronous information area and in the sensor area, respectively, of the transmission and reception buffer, to the transceiver 303.

For example, when a second beacon (Beacon (2)) transmitted from the base station 200 is received (in other words, when the counter value is "11"), the controller 308 passes the synchronous information (11) and the packet P1 of sensor data stored in the transmission and reception buffer, to the transceiver 303.

It should be noted that, when a first beacon (Beacon (1)) is received (in other words, when the counter value is "5"), the sensing terminal node 201 transmits no data packet because a data packet to be transmitted is not stored in the sensor area of the transmission and reception buffer.

Next, the sensing terminal node 201 transmits a data packet which includes sensor data and synchronous information, to the base station 200. It should be noted that a configuration of the data packet is described later with reference to FIG. 8.

After receiving the data packet, the base station 200 transmits a beacon (for example, Beacon (3)) which includes information indicating normal reception of the data packet (ACK), to the sensing terminal node 201.

When Beacon (3) including the signal of ACK described above is received, the controller 308 of the sensing terminal node 201 migrates a packet P2 stored in the sensor buffer 2 to the sensor area of the transmission and reception buffer, to thereby update the sensor area of the transmission and reception buffer.

After storing, in the sensor buffer 3, the sensor data (D(13), D(14), . . . , D(18)) corresponding to a third packet to be transmitted, the controller 308 stores sensor data (D(19), D(20), . . . , D(24)) corresponding to a fourth packet to be transmitted, in the sensor buffer 1 again.

It should be noted that the internal processing of the sensing terminal node 201 is described in detail with reference to FIG. 5. Further, the internal processing of the base station 200 is described in detail with reference to FIG. 6.

Figure 5:
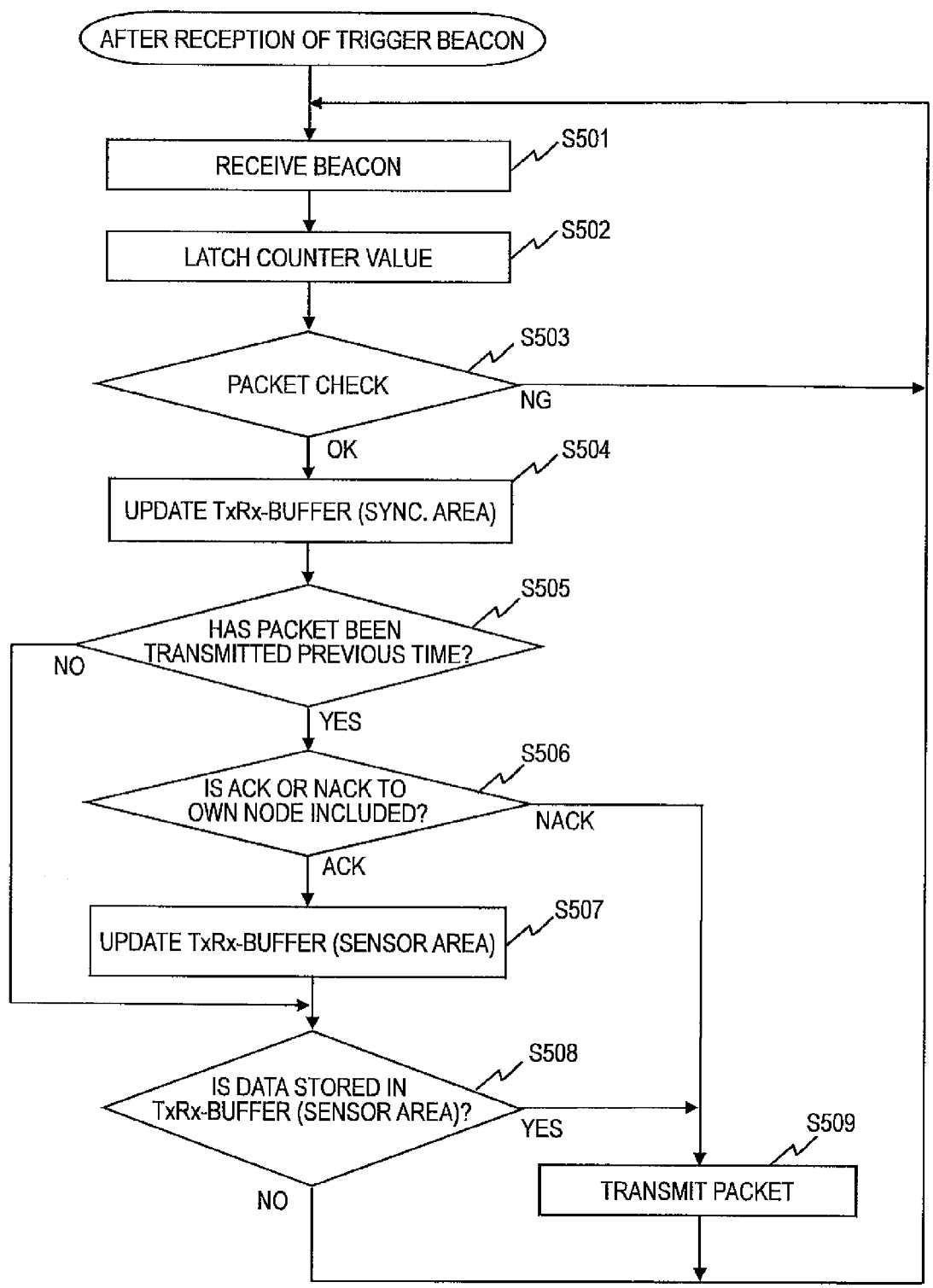
FIG. 5 is a flow chart illustrating an example of the processing to be performed by the sensing terminal node 201 according to the first embodiment of this invention.

FIG. 5 is a flow chart illustrating an example of the processing to be performed by the sensing terminal node 201 according to the first embodiment of this invention.

After receiving a trigger beacon, the transceiver 303 of the sensing terminal node 201 awaits a beacon, and receives a beacon transmitted by the base station 200 (S501).

The sensing terminal node 201, after receiving the beacon, transmits the received beacon to the controller 308 via the interface 307.

Next, the controller 308 latches a counter value of the counter 306 obtained when the beacon is received (S502).

Next, the controller 308 analyzes the received beacon packet so as to judge whether or not the beacon packet is a desired beacon to be received by the own station (S503).

In S503, when the beacon packet is the desired beacon (in other words, the received beacon packet is addressed to the own station), the controller 308 stores the counter value of the counter 306 latched as described above, in the synchronous information area of the transmission and reception buffer (S504).

On the other hand, in S503, when the beacon packet is not the desired beacon (in other words, the received beacon packet is not addressed to the own station, or the received beacon packet is transmitted from another network which the own station does not belong to), the controller 308 discards the received beacon packet, and the processing returns to S501.

Next, the controller 308 judges whether or not a data packet including sensor data is transmitted after receiving a previous beacon (S505).

Here, the previous beacon refers to a beacon (for example, Beacon (2) illustrated in FIG. 4) transmitted by the base station 200 immediately before the beacon (for example, Beacon (3) illustrated in FIG. 4) received by the sensing terminal node 201 in S501.

The controller 308 may refer to whether or not the transmission buffer is updated after the previous beacon has been received, in order to judge whether or not the sensing terminal node 201 has transmitted a data packet when a previous beacon is received. In other words, when the transmission buffer is updated, the controller 308 judges that a data packet has been transmitted.

When it is judged, in S505, that a data packet has been transmitted, the controller 308 next judges whether or not the received beacon packet includes one of ACK and NACK (S506).

When it is judged, in S506, that the beacon packet includes NACK, in other words, when a data packet transmitted previous time (specifically, a data packet transmitted after a previous beacon is received) has not been normally received by the base station 200, the sensing terminal node 201 retransmits a data packet stored in the transmission and reception buffer, the data packet being the same as the data packet transmitted for the previous time, to the base station 200 (S509).

On the other hand, when it is judged, in S506, that the beacon packet includes ACK, in other words, when a data packet transmitted previous time has been normally received by the base station 200, the sensing terminal node 201 updates a transmission and reception buffer (S507).

When it is judged, in S505, that no data packet is transmitted after receiving a previous beacon, the controller 308 next judges whether or not sensor data to be transmitted is stored in the sensor area of the transmission and reception buffer (S508).

When it is judged, in S508, that the sensor data is stored in the transmission and reception buffer, the sensing terminal node 201 transmits a data packet including the stored sensor data, to the base station 200 (S509).

On the other hand, when it is judged, in S508, that the sensor data is not stored in the transmission and reception buffer, the processing returns to S501 where the sensing terminal node 201 awaits reception of a next beacon.

When updating the transmission and reception buffer (sensor area) in S507, the controller 308 migrates a sensor data packet stored in the sensor buffer, to the transmission and reception buffer (sensor area), as sensor data to be transmitted at a timing when the next beacon is received. It should be noted that, when two or more packets are stored in the sensor buffer, the controller 308 migrates a packet which is first sampled, to the sensor area of the transmission and reception buffer.

After the sensor data packet to be transmitted next is migrated to the transmission and reception buffer, the sensing terminal node 201 transmits a data packet which includes sensor data and synchronous information, to the base station 200 (S509).

In one of cases where the sensor data to be transmitted is not stored in the transmission and reception buffer (sensor area) and where a packet data has just been transmitted (S509), the controller 308 awaits a next beacon (S501).

Next, a description is given of the processing of the base station 200.

Figure 6:
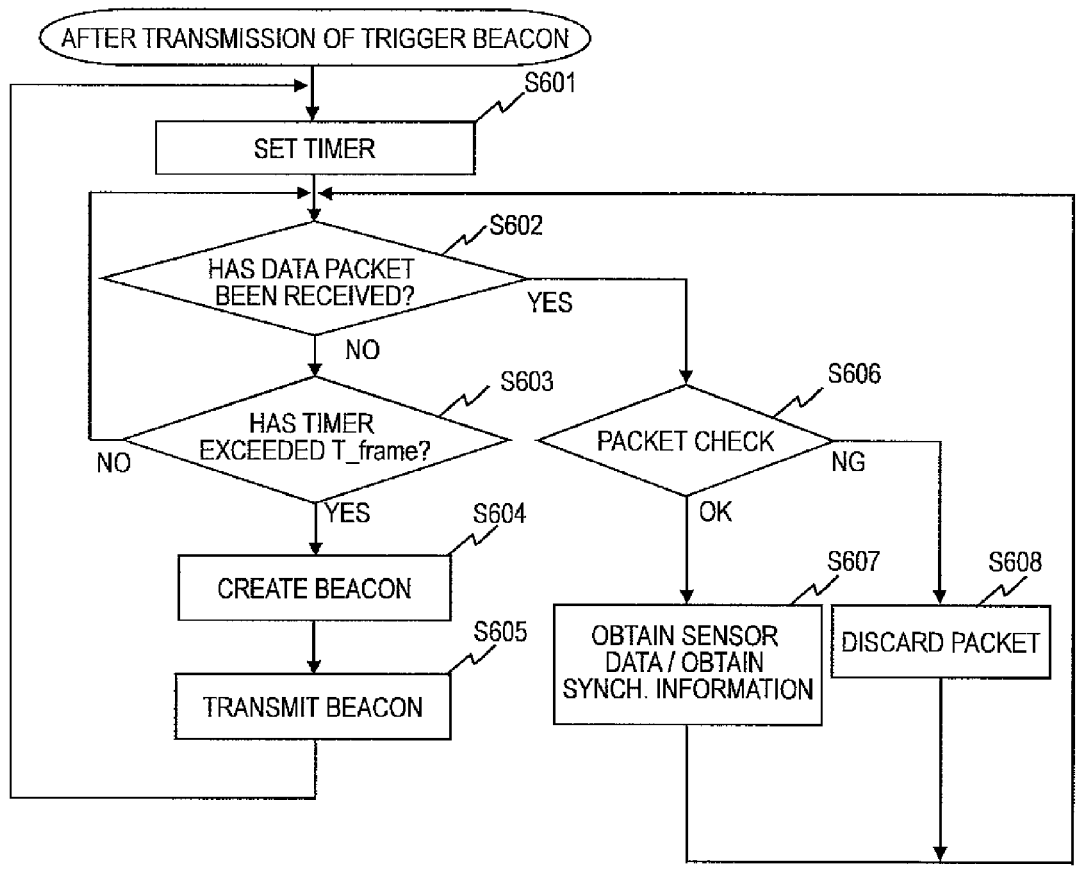
FIG. 6 is a flow chart illustrating an example of the processing to be performed by the base station 200 according to the first embodiment of this invention.

FIG. 6 is a flow chart illustrating an example of the processing to be performed by the base station 200 according to the first embodiment of this invention.

The base station 200, after receiving a trigger beacon, sets a timer to measure time (S601). Next, the base station 200, after setting the timer, awaits a data packet to be transmitted by the sensing terminal node 201.

Next, the base station 200 judges whether a data packet transmitted by any of the sensing terminal node 201 (and the sensing terminal nodes 202, 203, and 204) has been received or not (S602).

When it is judged, in S602, that the data packet has not been received, the base station 200 next judges whether or not a predetermined time (T_frame) has elapsed after the timer is set (S603). Here, T_frame corresponds to a transmission interval of beacons.

When it is judged, in S603, that T_frame has not elapsed, the processing of the base station 200 returns to S602.

When it is judged, in S603, that T_frame has elapsed, the base station 200 creates a beacon (S604). Next, the base station 200 transmits the created beacon to the sensing terminal node 201 (and the sensing terminal nodes 202, 203, and 204) (S605).

After the beacon is transmitted, the processing returns to S601, where the base station 200 again sets the timer. After that, the base station 200 repeats the above-mentioned processing each time a beacon is transmitted.

It should be noted that, in S604, when a data packet transmitted by the sensing terminal node 201 is normally received by the base station 200 after the previous beacon has been received, the base station 200 includes an identifier of the sensing terminal node 201 which has transmitted the data packet and information indicating normal reception of the data packet (ACK), in a beacon packet.

A configuration of the beacon packet is described later with reference to FIG. 9.

Next, a description is given of packet check processing to be performed after receiving a data packet transmitted from the sensing terminal node 201.

Meanwhile, in S602, when it is judged that a data packet is received, the base station 200 judges whether or not the received data packet is valid (S606). It should be noted that, to make the judgment, the base station 200 examines an identifier of the transmission source (sensing terminal node 201) included in a header of the received data packet, CRC, and the like, to thereby judge that the packet data is valid sensor data transmitted from a desired node. A configuration of the packet data is described later with reference to FIG. 8.

When it is judged, in S606, that the data packet is valid, the base station 200 obtains sensor data and synchronous information included in the received data packet (S607). After S607, the processing returns to S602, where the base station 200 awaits a data packet.

On the other hand, when it is judged, in S606, that the data packet is not valid, the base station 200 discards the received data packet (S608). After that, the processing returns to S602, where the base station 200 awaits a data packet.

The above-mentioned processing allows the sensing terminal node 201 to transmit sensor data and synchronous information to the base station 200, without the need to provide extra hardware.

Next, a description is given of a method of correcting a time at which sensor data is obtained, in the base station 200.

Figure 7:
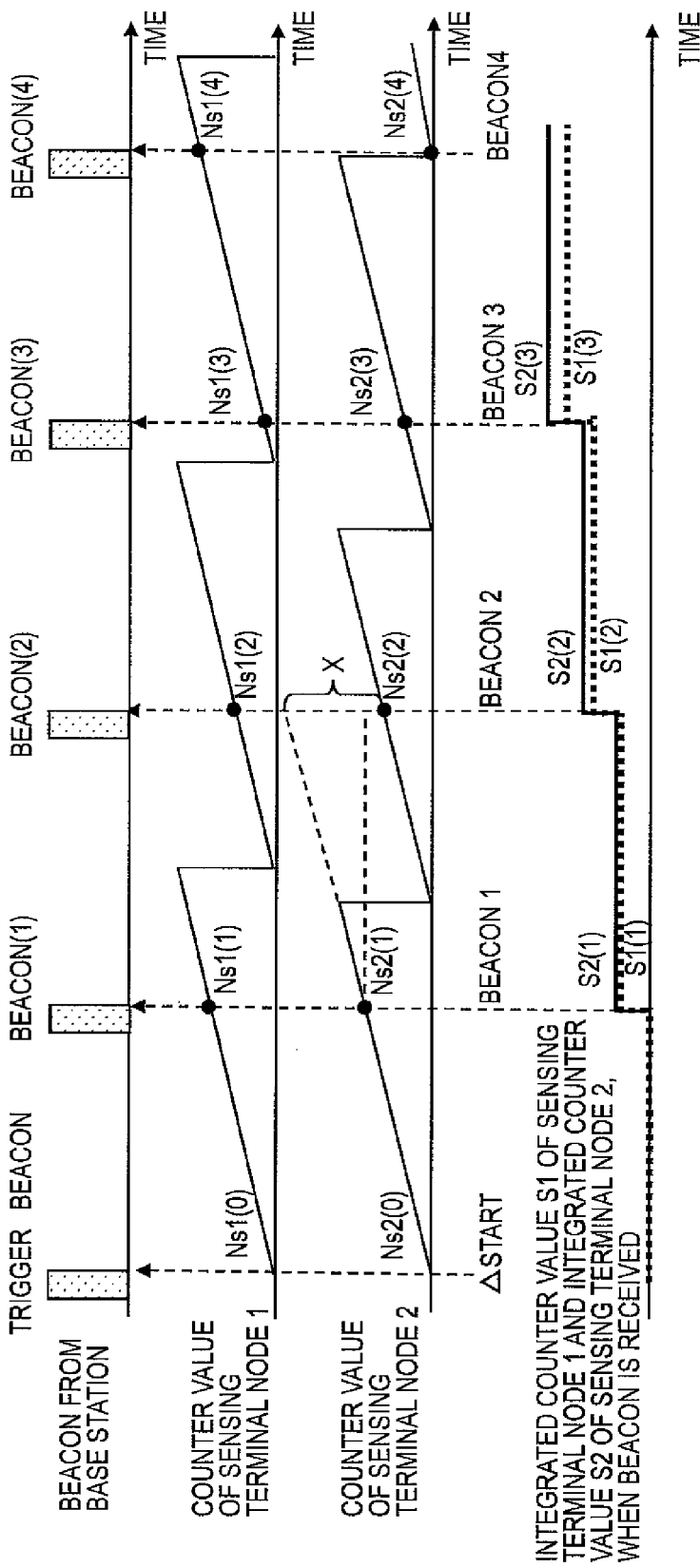
FIG. 7 is an explanatory diagram illustrating how to correct an acquisition time of sensor data according to the first embodiment of this invention.

FIG. 7 is an explanatory diagram illustrating how to correct an acquisition time of sensor data according to the first embodiment of this invention.

Here, a description is given of a relation among transmission timing of a beacon in the base station 200 (or reception timing of a beacon in the sensing terminal node 201), a counter value of the counter 306 of a certain sensing terminal node 1 (hereinafter, referred to as sensing terminal node 1 201), a counter value of the counter 306 of another sensing terminal node 2 (hereinafter, referred to as sensing terminal node 2 202) other than the sensing terminal node 1, an integrated counter value of the sensing terminal node 1 201, and an integrated counter value of the sensing terminal node 2 202, the integrated counter values being obtained when a beacon is received.

Ns1(K) corresponds to a counter value of the sensing terminal node 1 201 when a K-th beacon is received. Ns2(K) corresponds to a counter value of the sensing terminal node 2 202 when the K-th beacon is received.

S1(K) corresponds to an integrated value of the counter values counted by the sensing terminal node 1 201 from when a trigger beacon is received to when the K-th beacon is received. S2(K) corresponds to an integrated value of the counter values counted by the sensing terminal node 2 202 from when a trigger beacon is received to when the K-th beacon is received.

It should be noted a maximum counter value to be counted by the counter 306 provided to the sensing terminal node is limited according to the internal register. For example, the internal register is of 8 bits, countable values are from 0 to 255. Accordingly, an integrated counter value to be obtained when, for example, the sensing terminal node 2 202 has received a second beacon corresponds to a value obtained by adding X (maximum value of the counter 306+1) to Ns2(2).

Further, assuming that the sensing terminal node 1 201 receives M-th sensor data at a time T1(M) and the sensing terminal node 2 202 receives M-th sensor data at a time T2(M), and sampling intervals of each sensing terminal nodes 1 201 and 2 202 are ds1 and ds2, respectively, T1(M) and T2(M) are given by the following equations.

$$T1(M)=M\times ds1 \quad (1)$$

$$T2(M)=M\times ds2 \quad (2)$$

The sampling timing of each sensing terminal node is given by the clock 305 provided to each sensing terminal node. Accordingly, when the clock 305 of each sensing terminal node is correct, ds1 is equal to ds2.

However, the clocks 305 of the sensing terminal nodes usually have a margin of error, and hence ds1 is different from ds2 in value. Further, a sensing terminal node with a simple configuration which does not include hardware for receiving a standard time and frequency signal or the like is incapable of measuring, in a relative manner, the difference between a reference time (or clock) and a time counted by the internal clock.

Accordingly, in order to adjust sensor data acquisition times to one another in a relative manner among the sensing terminal nodes, the base station 200 needs to define a reference clock and to obtain a relative relation between ds1 and ds2 (ratio between the lengths of the intervals).

For example, when the clock 305 of the sensing terminal node 1 is used as a reference, T2(M) may be converted according to the following equation (3) by using a correction coefficient indicative of a relative relation between ds1 and ds2.

$$T2(M)=M\times ds1\times (\text{correction coefficient}) \quad (3)$$

In other words, the base station 200 may calculate the above-mentioned correction coefficient, to thereby obtain a common time axis shared by T1(M) and T2(M).

In this embodiment, the above-mentioned correction coefficient is obtained, based on the integrated values of the counters 306 of the sensing terminal node 1 201 and the sensing terminal node 2 202.

First, integrated values S1(K) and S2(K) of the counters 306 which are obtained when the sensing terminal node 1 201 and the sensing terminal node 2 202 each have received a K-th beacon are expressed by the following equations (4) and (5), respectively.

$$S1(K)=S1(K-1)+\Delta Ns1(K) \quad (4)$$

$$S2(K)=S2(K-1)+\Delta Ns2(K) \quad (5)$$

In the equations, $\Delta Ns(K)$ is defined by the following equation.

$$\Delta Ns(K)=Ns(K)-Ns(K-1) \text{ (when } Ns(K)\geq Ns(K-1))$$

$$\Delta Ns(K)=Ns(K)-Ns(K-1)+X \text{ (when } Ns(K)<Ns(K-1)) \quad (6)$$

In the equation, X=(counter maximum value+1).

Accordingly, the correction coefficient may be obtained as the following equation (7), based on the relation between S1(K) and S2(K).

$$(\text{Correction coefficient})=S1(K)/S2(K) \quad (7)$$

According to the method described above, the accuracy of the correction coefficient becomes higher as the measuring time increases, and therefore the base station 200 is capable of accurately correcting the clocks among the sensing terminal nodes in a relative manner.

It should be noted that in a case where the clock provided to the sensing terminal node 201 is stable and there is no need to carry out the measurement in real time, the base station 200 may obtain the correction coefficient after receiving all the sensor data, and correct the acquisition time of each sensor data by using the obtained correction coefficient.

Alternatively, in a case where the clock provided to the sensing terminal node 201 is unstable and it is conceivable that the clock error may vary in long hours of measurement, the base station 200 of the wireless sensor-network system may desirably obtain the correction coefficient periodically and correct the time axis of the clocks of the sensing terminal nodes.

For example, the above-mentioned integration may be executed each time a predetermined time elapses. Alternatively, the following equations (8) and (9) may be used to calculate the correction coefficient based on a shift integral of L times.

$$M1(K)=M1(K-1)+\Delta Ns1(K)-\Delta Ns1(K-L+1) \quad (8)$$

$$M2(K)=M2(K-1)+\Delta Ns2(K)-\Delta Ns2(K-L+1) \quad (9)$$

$$(\text{Correction coefficient})=M1(K)/M2(K) \quad (10)$$

As described above, the clocks of the sensing terminal nodes are corrected in a relative manner, based on the correction coefficient, to thereby adjust the sensor data acquisition times to one another among the sensing terminal nodes.

Next, a description is given of a configuration of a data packet to be transmitted from a sensing terminal node to a base station.

Figure 8:
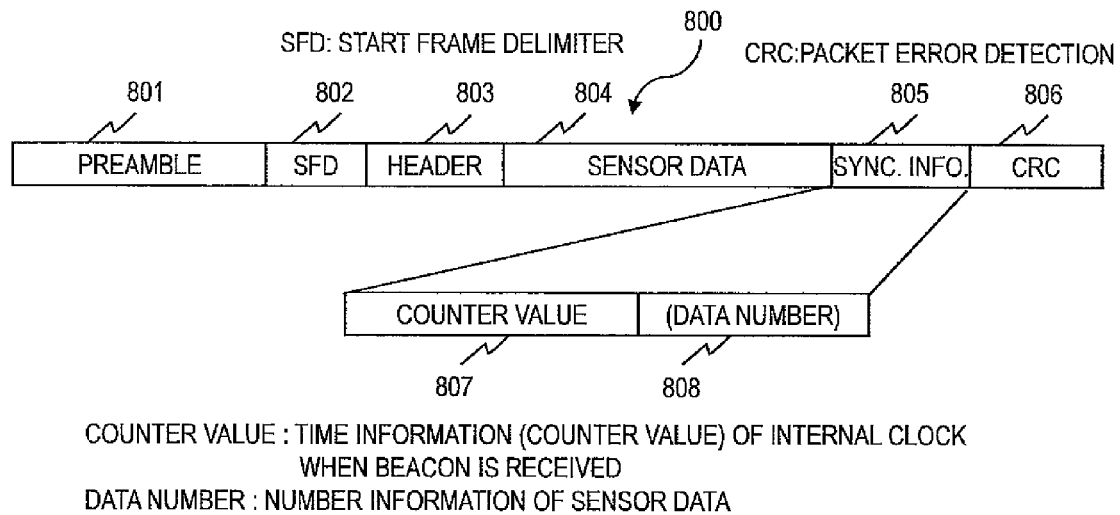
FIG. 8 is an explanatory diagram illustrating an example of a configuration of a data packet 800 according to the first embodiment of this invention.

FIG. 8 is an explanatory diagram illustrating an example of a configuration of a data packet 800 according to the first embodiment of this invention.

The data packet 800 includes a preamble portion 801, a start frame delimiter portion (SFD) 802, a header portion 803, a sensor data portion 804, and a synchronous information (sync. info.) portion 805, and a CRC portion 806.

The synchronous information portion 805 includes a time information (counter value) portion 807 and a data number portion 808.

The preamble portion 801 includes data necessary for demodulating a received signal by a receiver (not shown) of the base station 200. The SFD portion 802 is a delimiter indicative of a head of the data. The header portion 803 includes control information on, for example, a packet type, a communication parameter, network information, a transmission source, transmission destination information, and a packet sequence number. The sensor data portion 804 includes obtained sensor data.

The time information portion 807 of the synchronous information portion 805 includes time information (counter value) of the clock 305 obtained when the sensing terminal node 201 has received a beacon. The data number portion 808 of the synchronous information portion 805 includes a sequence number assigned to the sensor data.

It should be noted that the sensor data is assigned a sequence number so that the base station 200 may detect a dropout of the sensor data, to thereby improve reliability of the sensor data. The CRC portion 806 includes a check code for detecting an error in the data packet.

Next, a description is given of a configuration of a beacon packet transmitted from the base station 200.

Figure 9:
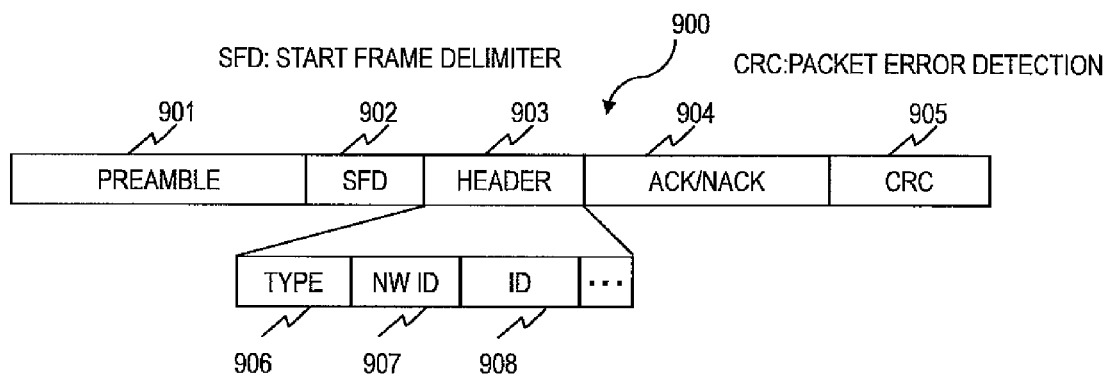
FIG. 9 is an explanatory diagram illustrating a configuration of a beacon packet 900 according to the first embodiment of this invention.

FIG. 9 is an explanatory diagram illustrating a configuration of a beacon packet 900 according to the first embodiment of this invention.

The beacon packet 900 includes a preamble portion 901, a start frame delimiter portion (SFD) 902, a header portion 903, an ACK/NACK portion 904, and a CRC portion 905.

The header portion 903 includes a packet type 906, network ID information (NW ID) 907, a transmission source ID information 908, a communication parameter, transmission destination information, a packet sequence number, and the like.

In particular, the packet type 906, the network ID information 907, and the transmission source ID information 908 are necessary for identifying the packet when there are a plurality of various networks.

The ACK/NACK portion 904 includes a reception confirmation code for notifying the sensing terminal node 201 of whether or not a previous data packet has been normally received by the base station 200.

It should be noted that each bit of the ACK/NACK portion 904 is assigned an identifier of each sensing terminal node connected to the network in advance, and each of the bits corresponding to the sensing terminal nodes may be assigned "1" which indicates ACK. This way allows the sensing terminal node 201 to judge, for example, in a case where a bit located on a position indicating the own station is assigned "1", that the data packet transmitted for the previous time has been normally received on the base station 200 side.

The preamble portion 901, the SFD portion 902, and the CRC portion 905 respectively correspond to the preamble portion 801, the SFD portion 802, and the CRC portion 806 illustrated in FIG. 8.

Next, a description is given of a method of transmitting a packet. There are several timings and methods according to which the sensing terminal node 201 transmits a data packet to the base station 200. According to the first embodiment of this invention, there may be employed a plurality of types of multiple access. Hereinbelow, three exemplary types of the multiple access are illustrated, but this invention is not limited thereto.

Figure 10A:
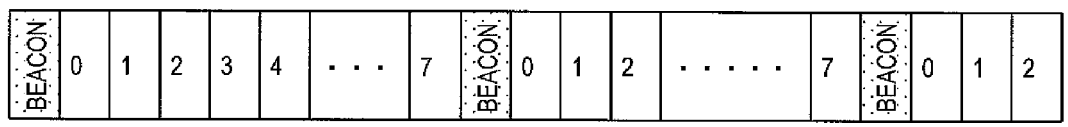
FIG. 10A is an explanatory diagram illustrating data to be transferred by time division multiple access (TDMA), according to the first embodiment of this invention.

FIG. 10A is an explanatory diagram illustrating data to be transferred by time division multiple access (TDMA), according to the first embodiment of this invention.

Time division multiple access (TDMA) is a method of assigning each sensing terminal node in the network a time in which the sensing terminal node is allowed to transmit a data packet. The sensing terminal node 201 transmits a data packet according to the assigned time (slot), with reference to a time at which a beacon is received.

Figure 10B:
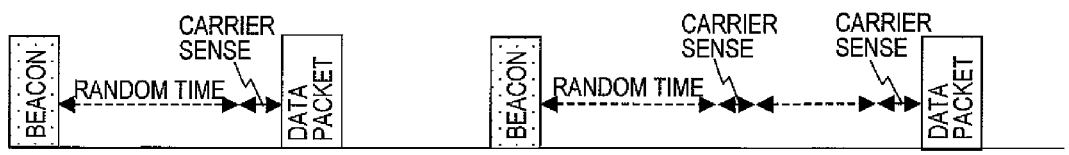
FIG. 10B is an explanatory diagram illustrating data to be transmitted by carrier sense multiple access (CSMA), according to the first embodiment of this invention.

FIG. 10B is an explanatory diagram illustrating data to be transmitted by carrier sense multiple access (CSMA), according to the first embodiment of this invention.

Carrier sense multiple access (CSMA) is a method of starting communication in the own station when another station is not transmitting a packet. When the own station transmits a packet, the sensing terminal node 201 judges whether or not any other station is transmitting a packet. When it is judged that the slot is vacant, the sensing terminal node 201 transmits a packet. When it is judged that the slot is not vacant, the sensing terminal node 201 stands by for a random time to retransmit the packet.

Figure 10C:
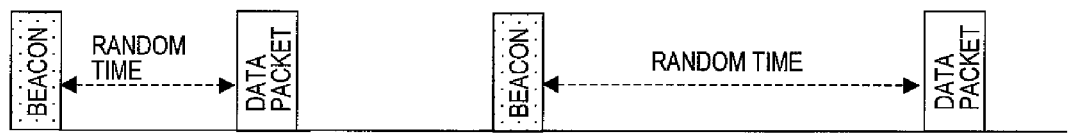
FIG. 10C is an explanatory diagram illustrating data to be transmitted by ALOHA, according to the first embodiment of this invention.

FIG. 10C is an explanatory diagram illustrating data to be transmitted by ALOHA, according to the first embodiment of this invention. ALOHA is a method of starting transmission in the own station at an arbitrary time without regard to a packet transmission in another station. The sensing terminal node 201 starts transmitting a packet at arbitrary timing. Further, when it is not confirmed that the transmitted packet has been normally received on the reception side, the sensing terminal node 201 stands by for a random time to retransmit the packet.

It should be noted that, in the first embodiment, the above-mentioned methods may be employed in combination. In general, an optimal method for multiple access may be appropriately selected, in view of a trade-off between a system throughput or reliability and a load on (power consumption in) the sensing terminal node.

In other words, when a priority is given to the throughput or reliability, TDMA is selected. Alternatively, when a priority is given to reducing a load on the sensing terminal node, CSMA or ALOHA is selected.

Further, according to the first embodiment, sensor data items (for example, $D(1)$, $D(2)$, $D(3)$, ...) consecutively obtained in chronological order are stored in the same packet (for example, P1). However, the sensor data items consecutively obtained in chronological order may be dispersed to be stored in different packets, to thereby increase the reliability of the sensor data.

Next, a modification example of the data packet configuration is described.

FIG. 11 is an explanatory diagram illustrating the modification example of the data packet configuration according to the first embodiment of this invention.

A packet number 1101 includes a number indicating the transmission order of the packet. Stored data 1102 includes sensor data contained in the packet. In the modification example illustrated in FIG. 11, the sensing terminal node 201 stores a group of consecutive sensor data items in a plurality of packets by dispersing the data, rather than storing the group of data in a single data packet.

In this manner, even when one packet drops out due to a communication failure and is not received on the base station 200 side, the base station 200 may complement or estimate the sensor data which has dropped out, by sensor data stored in another data packet received. In other words, the reliability of the obtained sensor data may be increased.

Further, according to the modification example illustrated in FIG. 11, the sensor data items are dispersed to a plurality of packets in sensor data units (for example, D(1)) each obtained at one sampling. Alternatively, the sensor data may be divided in units of bit, and the sensor data thus divided in units of bit may be dispersed to a plurality of packets, so as to be stored in different packets. In this case, the divided sensor data may be combined with an error correction code.

In this manner, even when some of the packets have dropped out, the base station 200 is capable of restoring or estimating the bits which have dropped out. In other words, the reliability of the sensor data may further be increased.

As described above, according to the first embodiment, even when the sensing terminal node is not provided with extra hardware for correcting a clock or the like, the base station is capable of synchronizing sensor data obtained by sensing terminal nodes. Accordingly, the wireless sensor-network system is capable of correctly processing the obtained sensor data.

Second Embodiment

Figure 12:
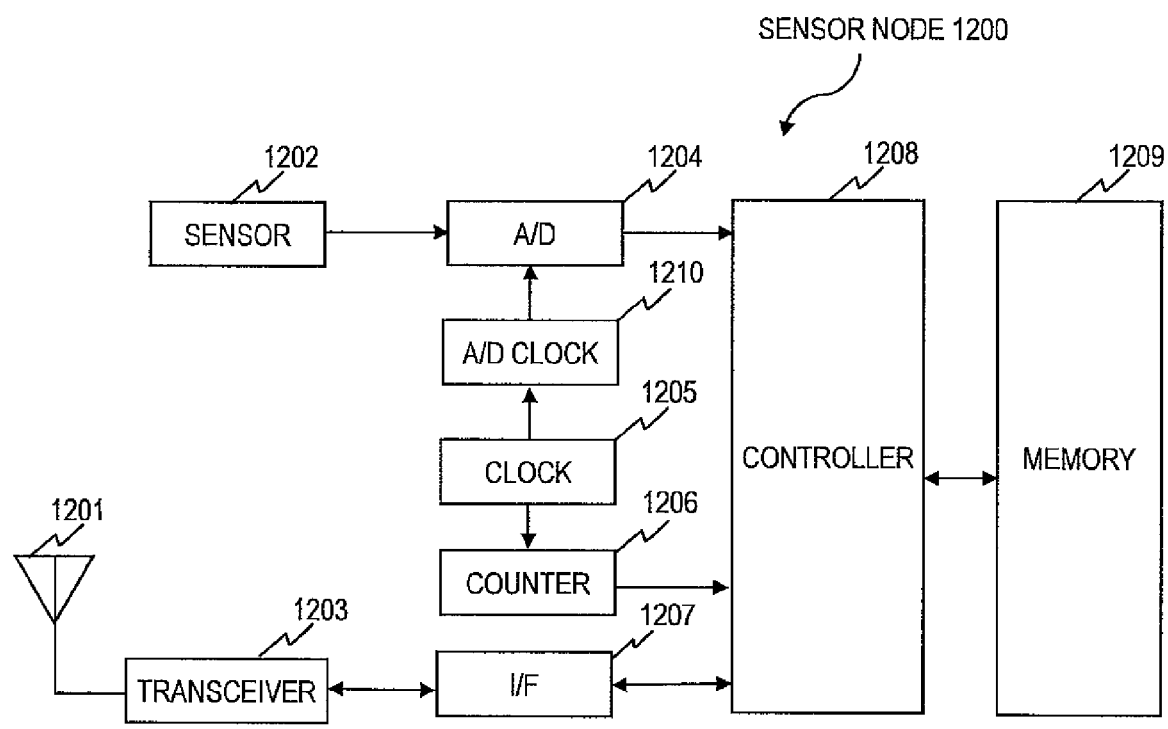
FIG. 12 is a block diagram illustrating an example of a configuration of a sensing terminal node according to a second embodiment of this invention.

FIG. 12 is a block diagram illustrating an example of a configuration of a sensing terminal node according to a second embodiment of this invention.

A sensing terminal node 1200 according to the second embodiment includes an antenna 1201, a sensor 1202, a transceiver 1203, an analog-to-digital converter (A/D) 1204, a clock 1205, a counter 1206, an interface (I/F) 1207, a controller 1208, a memory 1209, and an analog-to-digital clock generator (A/D clock generator) 1210.

The sensing terminal node 1200 according to the second embodiment is different from the sensing terminal node 201 according to the first embodiment illustrated in FIG. 3 in that the sensing terminal node 1200 includes the analog-to-digital clock generator 1210.

In the first embodiment, the interval of the clock supplied by the clock 305 of the sensing terminal node 201 is equal to the sampling interval of the sensor data.

On the other hand, according to the second embodiment, the interval of the clock supplied by the clock 1205 is smaller (for example, 1 kHz) than the sampling interval (for example, 1 Hz) of the sensor data.

In other words, the analog-to-digital clock generator 1201 generates a clock lower in frequency than the above-mentioned clock, based on the clock generated by the clock 1205. The clock generated by the analog-to-digital clock generator 1201 is for use in sampling environmental data by the analog-to-digital converter 1204.

Further, the analog-to-digital clock generator 1210 supplies the generated clock to the analog-to-digital converter 1204. Accordingly, in the second embodiment, the clock frequency and timing for sampling environmental data is different from the clock frequency and timing based on which the counter 1206 counts the counter value.

Even in this case, the clock supplied to the analog-to-digital converter 1204 is divided in frequency from the clock (master clock) supplied by the clock 1205, and therefore the sensor data acquisition time at each sensing terminal node may be corrected by the same method as in the first embodiment.

As described above, according to the second embodiment, the wireless sensor-network system is capable of correcting the sensor data acquisition time with high accuracy, irrespective of the sampling interval.

Further, similarly to the effect obtained in the first embodiment, the sensing terminal node may be simply configured without requiring extra hardware to be implemented as a reception device for receiving a standard time and frequency signal or the like, or as a clock correcting function.

Further, the base station of the wireless sensor-network system is capable of correcting sensor data acquisition times at multiple points, by a sensing terminal node with a simple configuration.

Further, the sensor data acquisition times may be adjusted to one another merely through processing of transmitting sensor data together with a time (timing) at which a beacon is received. Accordingly, there may be constructed a wireless sensor-network system in which communication resources are not consumed.

Third Embodiment

Next, a description is given of an example in which the wireless sensor-network system according to this embodiment is applied to a device which is provided inside an automobile and measures data (for example, driving data).

Figure 13:
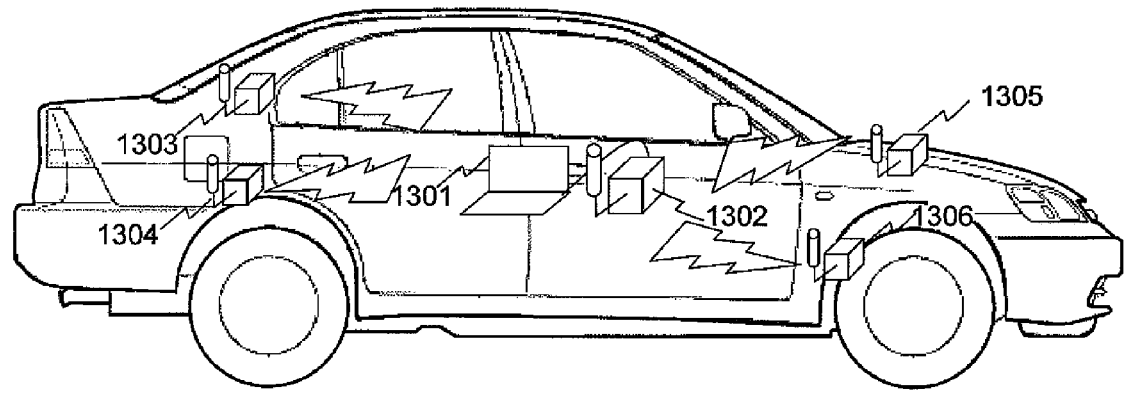
FIG. 13 is an explanatory diagram illustrating an example of a configuration of a wireless sensor-network system according to a third embodiment of this invention.

FIG. 13 is an explanatory diagram illustrating an example of a configuration of a wireless sensor-network system according to a third embodiment of this invention.

The wireless sensor-network system according to the third embodiment includes a display analyzer 1301, a base station 1302, a sensing terminal node 1303, a sensing terminal node 1304, a sensing terminal node 1305, and a sensing terminal node 1306.

It should be noted that the plurality of sensing terminal nodes 1303, 1304, 1305, and 1306 illustrated in FIG. 13 may be the same in configuration as the sensing terminal node 201 illustrated in FIG. 1. Hereinafter, the plurality of sensing terminal nodes are collectively referred to as the sensing terminal node 1303 when a description applicable to any of the sensing terminal nodes is given. Further, the number of sensing terminal nodes illustrated in FIG. 13 is four, which may be appropriately changed according to the architecture of the wireless sensor-network system.

The sensing terminal node 1303 measures various data regarding the automobile. Here, the various data of the automobile includes, for example, information on acceleration, temperature, humidity, pressure, relative speed with respect to a road surface, and the like.

Further, the sensing terminal node 1303 transmits the above-mentioned sensor data to the base station 1302. The display analyzer 1301 displays or analyzes the sensor data transmitted to the base station 1302.

According to the third embodiment, synchronism among sensor data transmitted from the sensing terminal nodes is guaranteed, and hence an accurate behavior of the automobile is obtained. Further, the above-mentioned wireless sensor-network system is implemented by a wireless network, and hence the sensing terminal node may be installed, detached or attached, additionally provided, and maintained, with ease.

Further, the obtained sensor data or analyzed sensor data may be used for controlling the automobile. In other words, the automobile is controlled based on the sensor data obtained at multiple points, to thereby attain advanced drive for the purpose of promoting safety and comfort.

While the present invention has been described in detail and pictorially in the accompanying drawings, the present invention is not limited to such detail but covers various obvious modifications and equivalent arrangements, which fall within the purview of the appended claims.

What is claimed is:

1. A wireless sensor-network system, comprising:
a base station; and
a plurality of sensing terminal nodes,
the base station transmitting a beacon at predetermined timing to the plurality of sensing terminal nodes, the plurality of sensing terminal nodes measuring data and transmitting, according to the beacon that has been transmitted from the base station, the measured data to the base station, wherein:
the plurality of sensing terminal nodes comprise a first sensing terminal node serving as a reference and a second sensing terminal node other than the first sensing terminal node;
the plurality of sensing terminal nodes each comprise: a sensor for measuring predetermined data; a transmission and reception unit for transmitting and receiving a signal to and from the base station; and a control unit for controlling acquisition of the data measured by the sensor and transmission of the obtained data;
the control unit obtains a time at which the beacon is received;
the transmission and reception unit transmits the reception time of the beacon and the obtained data, to the base station; and
the base station receives the reception time of the beacon and the obtained data in each of the plurality of sensing terminal nodes, and corrects an acquisition time of the data, based on a relative relation between the beacon reception time received from the first sensing terminal node and the beacon reception time received from the second sensing terminal node.

2. The wireless sensor-network system according to claim 1, wherein:
the plurality of sensing terminal nodes each further comprise a clock unit and a counter unit for counting a clock generated by the clock unit;
the control unit associates a counter value counted by the counter unit with the beacon reception time; and
the base station integrates the counter value of each of the plurality of sensing terminal nodes for each sensing terminal node, and corrects the acquisition time of the data measured by the second sensing terminal node, based on a ratio of a first integrated value of the counter value of the first sensing terminal node to a second integrated value of the counter value of the second sensing terminal node.

3. The wireless sensor-network system according to claim 2, wherein:
the plurality of sensing terminal nodes each further comprise an analog-to-digital converter for obtaining, through sampling, the data measured by the sensor; and
the analog-to-digital converter samples the data measured by the sensor, based on the clock generated by the clock unit, so that the number of times that the data is sampled becomes equal to the counter value.

4. The wireless sensor-network system according to claim 2, wherein:
the base station transmits a trigger beacon; and
the plurality of sensing terminal nodes each initialize, when the trigger beacon is received, the counter value, and start measuring data.

5. The wireless sensor-network system according to claim 1, wherein:
the plurality of sensing terminal nodes each further comprise a storage unit for storing the obtained data;
the control unit stores a plurality of packets including the beacon reception time and the obtained data, in the storage unit;
the transmission and reception unit transmits the plurality of stored packets to the base station; and
the control unit retransmits, when the transmission of the plurality of packets fails, the plurality of packets stored in the storage unit, to the base station.

6. The wireless sensor-network system according to claim 5, wherein:
the base station includes one of information indicating that the packet has been correctly received and information indicating that the packet has been incorrectly received, in the beacon, and transmits the beacon including any one of the information, to the plurality of sensing terminal nodes; and
the control unit judges, based on the information included in the beacon, whether or not the packet has been correctly transmitted.

7. The wireless sensor-network system according to claim 1, wherein:
the control unit divides a sequence of the obtained data into data segments in predetermined units, and stores, of the data segments, data segments adjacent to each other in different packets; and
the transmission and reception unit transmits the packet in which the data segment is stored, to the base station.

8. A sensing terminal node for measuring data, which is connected to a base station, the base station transmitting a beacon at predetermined timing,
the sensing terminal node transmitting, according to the beacon that has been transmitted from the base station, the measured data to the base station,
the sensing terminal node including: a sensor for measuring predetermined data; a transmission and reception unit for transmitting and receiving a signal to and from the base station; a control unit for controlling acquisition of the data measured by the sensor and transmission of the obtained data; a clock unit and a counter unit for counting a clock generated by the clock unit,
wherein:
the control unit obtains a time at which the beacon is received;
the transmission and reception unit transmits the reception time of the beacon and the obtained data, to the base station; and
the control unit associates a counter value counted by the counter unit with the reception time of the beacon.

9. The sensing terminal node according to claim 8, further comprising an analog-to-digital converter for obtaining, through sampling, the data measured by the sensor,
wherein the analog-to-digital converter samples the data measured by the sensor, based on the clock generated by the clock unit, so that the number of times that the data is sampled becomes equal to the counter value.

10. The sensing terminal node according to claim 8, which is further configured to initialize, when a trigger beacon that has been transmitted from the base station is received, the counter value, and start measuring data.

11. A sensing terminal node for measuring data, which is connected to a base station, the base station transmitting a beacon at predetermined timing,
the sensing terminal node transmitting, according to the beacon that has been transmitted from the base station, the measured data to the base station,
the sensing terminal node including: a sensor for measuring predetermined data; a transmission and reception unit for transmitting and receiving a signal to and from the base station; and a control unit for controlling acquisition of the data measured by the sensor and transmission of the obtained data; a storage unit for storing the obtained data, wherein:

the control unit obtains a time at which the beacon is received;

the transmission and reception unit transmits the reception time of the beacon and the obtained data, to the base station;

the control unit stores a plurality of packets including the reception time of the beacon and the obtained data, in the storage unit;

the transmission and reception unit transmits the plurality of stored packets to the base station; and the control unit retransmits, when the transmission of the plurality of packets fails, the plurality of packets stored in the storage unit, to the base station.

12. The sensing terminal node according to claim 11, wherein the control unit judges, based on any one of information indicating that the packet included in the beacon has been correctly received and information indicating that the packet has been incorrectly received, whether or not the packet has been correctly transmitted.

13. A sensing terminal node for measuring data, which is connected to a base station, the base station transmitting a beacon at predetermined timing, wherein:

the sensing terminal node transmitting, according to the beacon that has been transmitted from the base station, the measured data to the base station, the sensing terminal node including: a sensor for measuring predetermined data; a transmission and reception unit for transmitting and receiving a signal to and from the base station; and a control unit for controlling acquisition of the data measured by the sensor and transmission of the obtained data, wherein:

the control unit obtains a time at which the beacon is received;

the transmission and reception unit transmits the reception time of the beacon and the obtained data, to the base station;

the control unit of the sensing terminal node divides a sequence of the obtained data into data segments in predetermined units, and stores, of the data segments, data segments adjacent to each other in different packets; and the transmission and reception unit transmits the packet in which the data segment is stored, to the base station.

14. A base station connected to a plurality of sensing terminal nodes for measuring data; wherein:

the base station transmits a beacon at predetermined timing;

the plurality of sensing terminal nodes comprise a first sensing terminal node serving as a reference and a second sensing terminal node other than the first sensing terminal node;

the plurality of sensing terminal nodes each transmit, according to the beacon that has been transmitted from the base station, the measured data to the base station; and the base station receives a reception time of the beacon and the obtained data, from each of the plurality of sensing terminal nodes, and corrects an acquisition time of the data, based on a relative relation between the beacon reception time received from the first sensing terminal node and the beacon reception time received from the second sensing terminal node.

15. The base station according to claim 14, which is further configured to integrate a counter value counted by each of the plurality of sensing terminal nodes based on a predetermined clock signal, for each of the plurality of sensing terminal nodes, and corrects an acquisition time of the data measured by the second sensing terminal node, based on a ratio of a first integrated value of the counter value of the first sensing terminal node to a second integrated value of the counter value of the second sensing terminal node.

16. The base station according to claim 15, which is further configured to transmit a trigger beacon instructing the plurality of sensing terminal nodes to initialize the counter value.

17. The base station according to claim 14, which is further configured to:

include one of information indicating that a packet has been correctly received and information indicating that the packet has been incorrectly received, in the beacon; and transmit the beacon including any one of the information, to the plurality of sensing terminal nodes, to control the plurality of sensing terminal nodes to judge whether or not the packet has been correctly transmitted.

* * * * *